US007821383B2

(12) United States Patent
Sultan et al.

(10) Patent No.: US 7,821,383 B2
(45) Date of Patent: Oct. 26, 2010

(54) APPARATUS FOR MEDIUM-RANGE VEHICLE COMMUNICATIONS AND CONTROL

(75) Inventors: Michel F. Sultan, Troy, MI (US); Dale L. Partin, Ray Township, MI (US); Craig A. Tieman, Westfield, IN (US); Todd P. Oman, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 284 days.

(21) Appl. No.: 12/218,848

(22) Filed: Jul. 18, 2008

(65) Prior Publication Data

US 2009/0096596 A1 Apr. 16, 2009

Related U.S. Application Data

(63) Continuation-in-part of application No. 11/973,716, filed on Oct. 10, 2007, and a continuation-in-part of application No. 12/150,872, filed on May 1, 2008.

(51) Int. Cl.
*B60R 25/10* (2006.01)

(52) U.S. Cl. .............................. 340/426.13; 340/425.5; 340/5.64; 340/426.12

(58) Field of Classification Search .............. 340/425.5, 340/426.12, 426.13, 426.14, 426.15, 426.16, 340/426.17, 426.36, 5.33, 5.6, 5.61, 5.64
See application file for complete search history.

(56) References Cited

U.S. PATENT DOCUMENTS 6,917,801 B2 * 7/2005 Witte et al. .............. 340/426.1
6,970,703 B2 * 11/2005 Fuchs et al. .............. 455/426.1
7,042,342 B2 5/2006 Luo et al.
7,146,129 B2 * 12/2006 Bostrom et al. ......... 340/426.13
7,221,256 B2 * 5/2007 Skekloff et al. ............ 340/5.61
7,224,262 B2 * 5/2007 Simon et al. ........... 340/426.13
7,349,722 B2 * 3/2008 Witkowski et al. ....... 455/569.2
7,504,931 B2 * 3/2009 Nguyen ................. 340/426.36
2002/0146999 A1 * 10/2002 Witte .......................... 455/345
2006/0052140 A1 3/2006 Hicks, III
2006/0099117 A1 5/2006 Connet et al.
2006/0114100 A1 6/2006 Ghabra et al.
2006/0145810 A1 7/2006 Buccinna et al.
2006/0222120 A1 10/2006 Yegin et al.
2007/0085656 A1 4/2007 Tang et al.
2007/0162229 A1 7/2007 McCarthy et al.

* cited by examiner

*Primary Examiner*—Eric M Blount
(74) *Attorney, Agent, or Firm*—Jimmy L. Funke

(57) ABSTRACT

Medium-range remote communication and control for a vehicle is achieved with a wireless vehicle telematics unit, a medium-range wireless portable fob, and an unmodified wireless personal communication device. The portable fob includes a medium-range RF transceiver for bi-directional communication with the telematics unit and a short-range wireless transceiver for bi-directional communication with the personal communication device. The fob communicates with the vehicle telematics unit in a conventional manner, and also relays information between the telematics unit and the personal communication device. Communication can be initiated by the telematics unit or by the operator via the fob or personal communication device. Once communication is initiated, the fob relays: (1) menu options and status information from the telematics unit to the personal communication device; and (2) menu selections from the personal communication device to the telematics unit. No cellular network service or special programming is required for the personal communications device.

5 Claims, 1 Drawing Sheet

APPARATUS FOR MEDIUM-RANGE VEHICLE COMMUNICATIONS AND CONTROL

RELATED APPLICATIONS

This is a continuation-in-part of co-pending U.S. patent application Ser. No. 11/973,716, filed Oct. 10, 2007, and Ser. No. 12/150,872), filed May 1, 2008, which applications are assigned to the assignee of the present invention.

TECHNICAL FIELD

The present invention relates to medium-range communication and control for a vehicle, and more particularly to a low-cost method and apparatus utilizing an OEM-provided or aftermarket-provided wireless key fob and a user-provided wireless personal communication device.

BACKGROUND OF THE INVENTION

Medium-range remote access and control of a motor vehicle can be achieved with a user-carried RF transceiver such as a so-called “smart key fob”. For example, the fob can be used not only to gain entry to the vehicle, but also to start the engine, access vehicle status information, and so forth. Similar functionality can be achieved with a specially programmed personal communication device such as a cell phone or PDA, as described for example in the U.S. Pat. No. 6,970,703 to Fuchs et al. and the U.S. Pat. No. 7,224,262 to Simon et al., both of which are incorporated herein by reference.

Both of the above-described approaches have drawbacks. For example, smart key fobs tend to become both too large and too expensive when human-machine interface (HMI) devices such as keypads and displays are integrated into the fob. And requiring the vehicle operator to use a specially programmed personal communication device and to pay for cellular network service is also undesirable. Accordingly, what is needed is an improved and lower-cost way of achieving medium-range remote communication and control for a vehicle.

SUMMARY OF THE INVENTION

The present invention is directed to an improved wireless communication apparatus for achieving medium-range remote communication and control for a vehicle with a wireless telematics unit mounted in the vehicle, a medium-range wireless portable fob provided by the vehicle manufacturer or after-market supplier, and an unmodified wireless personal communication device provided by the vehicle operator. The portable fob includes a medium-range RF transceiver for bi-directional communication with the vehicle telematics unit and a short-range wireless transceiver for bi-directional communication with the operator’s personal communication device. The fob communicates with the vehicle telematics unit in a conventional manner, and also relays information between the telematics unit and the personal communication device. Communication can be initiated by the telematics unit or by the operator via the fob or personal communication device. Once a communication has been initiated, the fob relays: (1) menu options and status information from the telematics unit to the personal communication device; and (2) menu selections from the personal communication device to the telematics unit. No special programming is required for the personal communications device, and no cellular or satellite network service is required.

DESCRIPTION OF THE PREFERRED EMBODIMENT

Figure 1:
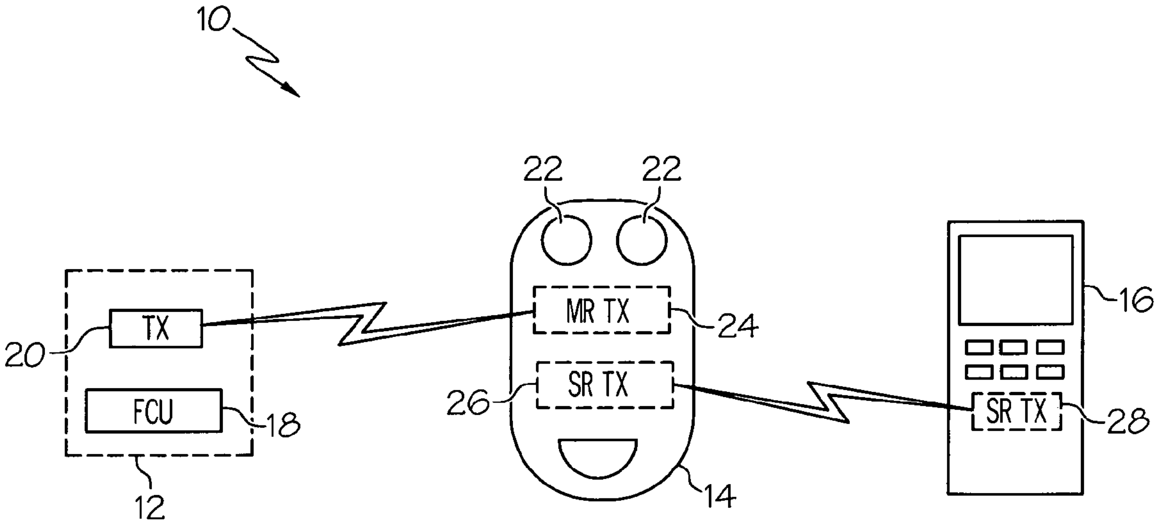
FIG. 1 is a diagram of a bi-directional vehicle information and control system according to this invention, including a vehicle-installed telematics unit, a wireless fob and a wireless personal communication device.

Referring to the drawings, and particularly to FIG. 1, the reference numeral 10 generally designates a bi-directional vehicle information and control system including a vehicle-installed wireless telematics unit 12, an operator-carried wireless portable fob 14 and an operator-carried wireless personal communication device 16 such as a cell phone or PDA. The telematics unit 12 includes a function control unit 18 that interfaces with various vehicle control systems and wireless RF transceiver 20.

Fob 14 incorporates a conventional user interface, including depressible buttons 22 for signaling command functions such as door locking and unlocking, trunk unlatching, and alarm activation and deactivation. When a button 22 is depressed, a medium-range RF transceiver 24 within fob 14 establishes a bi-directional communication link with function control unit 18 via RF transceiver 20 for authenticating the user and carrying out the corresponding command. Fob 14, function control unit 18, and RF transceiver 20 can also constitute a passive entry system wherein the function control unit 18 automatically locks or un-locks the vehicle doors when the user-carried fob 14 crosses a prescribed distance threshold from the transceiver 20.

Fob 14 additionally incorporates a short-range wireless transceiver 26 for bi-directional communication with the operator’s personal communication device 16 via an internal short-range wireless transceiver 28. The transceivers 26 and 28 may be Bluetooth IEEE 802.11g/b/a/n, Near Field Communication (NFC), WiFi, or WiMax, for example. The transceivers 20 and 26 effectively create a wireless local area network (WLAN) between telematics unit 12 and the Bluetooth, 802.11, NFC, WiFi, WiMax, or equivalently enabled personal communication devices 16. In this capacity, fob 14 operates to relay information between the vehicle telematics unit 12 and the personal communication device 16.

Communications between telematics unit 12 and personal communication device 16 can be initiated by telematics unit 12 or by the operator. For example, the function control unit 18 can be programmed to initiate a communication in response to the occurrence of a specified event such as high cabin temperature, low tire pressure, unauthorized entry, low battery voltage, and so on. The communication uses the human machine interface of the personal communication device 16 to inform the operator of the event, or to provide additional information including video and/or audio data from the vehicle. Operator-initiated communications can be initiated, for example, by simply depressing a button on the personal communication device 16 or fob 14. In this case, the operator action causes the fob 14 to send a wake-up signal to telematics unit 12, and the telematics unit 12 responds by requesting an instruction once communication authentication has been achieved. The communication can be authenticated by the fob 14 (using a conventional rolling code, for example) or by the operator (by entry of a PIN code or password, for example).

An important aspect of this invention is that the telematics unit 12 is programmed to communicate with an unmodified personal communication device 16. This is achieved by transmitting ordinary voice, text or video data to the personal communication device 16 (via fob 14) prompting the operator to respond or make a selection that the telematics unit 12 will understand. In authentication, for example, the telematics unit 12 can send a voice or text message to personal communication device 16 instructing the operator to enter a prescribed password. And once authentication is achieved, telematics unit 12 can send a voice, text or video message to personal communication device 16 listing a menu of possible command options, and instructing the operator to make a selection by voice or by depressing a prescribed button, for example. The following is an example of a voice message: "to check for vehicle status, press or say one", "to start the vehicle, press or say two", or "to change the vehicle temperature, press or say three", etc. A similar inquiry could be configured as a text message. A video inquiry could be used to convey the same information symbolically to make the communication language-independent.

Another important aspect of this invention is that no cellular or satellite network service is required to utilize the operator's personal communication device 16. The personal communication device 16 only has to be equipped with a short-range wireless transceiver 26 to allow short-range communication between it and the fob 14, which in turn, relays the communications to (and from) the telematics unit 12.

In summary, the present invention provides an improved and low-cost way of achieving medium-range remote communication and control of a vehicle. The disclosed arrangement utilizes the human-machine-interface of the operator's personal communication device 16 to limit the cost impact to telematics unit 12 and fob 14, and yet does so without requiring the operator to download special purpose application software for the personal communication device 16 or pay for cellular or satellite communication services. And the arrangement is especially advantageous when used in connection with an extended range fob that supports RF communications at a range of up to one kilometer from telematics unit 12.

While the invention has been described with respect to the illustrated embodiment, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. Communication and control apparatus for a vehicle, comprising:

a vehicle-installed wireless telematics unit;

a wireless personal communication device carried by a vehicle operator; and a wireless fob carried by the vehicle operator for relaying communications between the telematics unit and the personal communication device via a medium-range wireless communication link with the telematics unit and a short-range wireless communication link with the personal communication device, the relayed communications including a function menu communication from the telematics unit to the personal communication device, and a menu selection communication from the personal communication device to the telematics unit.

2. The communication and control apparatus of claim 1, where:

the function menu communication is in the form of a text or voice message.

3. The communication and control apparatus of claim 1, where:

the function menu communication is in the form of a video image.

4. The communication and control apparatus of claim 1, where:

a communication relayed by the fob from the telematics unit to the personal communication device is initiated by the telematics unit in response to detection of a specified event.

5. The communication and control apparatus of claim 1, where:

a relayed communication from the telematics unit is initiated by the operator via the personal communication device or the fob.

* * * * *